United States Patent
Geislinger et al.

(10) Patent No.: US 8,783,998 B2
(45) Date of Patent: Jul. 22, 2014

(54) FORCE-FITTING CLAMPING CONNECTION AND METHOD FOR ITS PRODUCTION

(75) Inventors: Matthias Geislinger, Salzburg (AT); Cornelius Geislinger, Salzburg (AT); Christof Sigle, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 1864 days.

(21) Appl. No.: 12/060,205

(22) Filed: Mar. 31, 2008

(65) Prior Publication Data

US 2008/0247817 A1 Oct. 9, 2008

(30) Foreign Application Priority Data

Apr. 5, 2007 (DE) .......................... 10 2007 016 643

(51) Int. Cl.
*B25G 3/00* (2006.01)
*F16B 2/14* (2006.01)
*F16G 11/00* (2006.01)

(52) U.S. Cl.
USPC ........................................ 403/408.1; 403/337

(58) Field of Classification Search
USPC ............ 403/335–338, 408.1, 409.1; 411/160, 411/184, 189
See application file for complete search history.

(56) References Cited

U.S. PATENT DOCUMENTS

| | | | | |
|---|---|---|---|---|
| 240,387 A * | 4/1881 | Cowdy | ........................... | 411/161 |
| 1,196,565 A * | 8/1916 | McDonald | ..................... | 411/184 |
| 1,420,725 A * | 6/1922 | Mattson | ......................... | 411/160 |
| 1,584,711 A * | 5/1926 | Astrom | ....................... | 403/408.1 |
| 1,976,077 A * | 10/1934 | Simons et al. | ................. | 411/187 |
| 2,616,328 A * | 11/1952 | Kingsmore | ................... | 411/80.2 |
| 3,179,143 A * | 4/1965 | Schultz et al. | ................ | 411/82.2 |
| 3,416,823 A * | 12/1968 | Auer | ........................... | 403/408.1 |
| 3,543,222 A * | 11/1970 | Rheinfelder | ................... | 439/394 |
| 3,682,508 A * | 8/1972 | Briles | ........................... | 411/176 |
| 4,270,871 A * | 6/1981 | Grise | .............................. | 403/29 |
| 4,316,690 A * | 2/1982 | Voller | ........................... | 411/377 |
| 4,813,833 A * | 3/1989 | Haab | ............................. | 411/188 |
| 5,417,529 A * | 5/1995 | Volkmann et al. | .............. | 411/82 |
| 6,045,291 A * | 4/2000 | Ruehle et al. | ................. | 403/297 |
| 6,068,233 A * | 5/2000 | Green | ........................... | 248/548 |
| 6,171,009 B1 * | 1/2001 | Wright | ............................ | 403/30 |
| 6,294,029 B1 * | 9/2001 | Sakate et al. | .................. | 148/211 |
| 6,516,652 B1 * | 2/2003 | May et al. | ......................... | 73/10 |
| 6,659,702 B2 * | 12/2003 | Kitayama et al. | ............. | 411/546 |
| 6,899,488 B2 * | 5/2005 | Geringer et al. | .............. | 403/337 |

FOREIGN PATENT DOCUMENTS

| | | |
|---|---|---|
| DE | 1077005 | 3/1960 |
| DE | 1816854 | 12/1969 |
| DE | 19531077 | 2/1997 |
| DE | 10134809 | 2/2003 |
| DE | 10134809 A1 | 6/2003 |

(Continued)

*Primary Examiner* — Daniel P Stodola
*Assistant Examiner* — Nahid Amiri
(74) *Attorney, Agent, or Firm* — Myers Wolin, LLC

(57) ABSTRACT

A force-fitting clamping connection includes a first metal clamping surface, a second metal clamping surface, and a clamping element for clamping the clamping surfaces against one another. The first clamping surface forms a hardened fine surface structure with microreliefs and microdepressions. The second clamping surface has a lower hardness than the first clamping surface. Preferably, the first clamping surface is surface-treated by sand-blasting, shot-blasting or embossing before the hardening operation. This allows permanently high friction coefficient values between the clamping surfaces. A flange connection includes such a clamping connection for transmitting high torques.

11 Claims, 3 Drawing Sheets

(56) References Cited

FOREIGN PATENT DOCUMENTS

| | | |
|---|---|---|
| EP | 1215400 | 6/2002 |
| JP | 5248010 | 9/1993 |
| JP | 8209809 | 8/1996 |
| JP | 2000087946 | 3/2000 |
| JP | 2002155910 | 5/2002 |
| JP | 2006169570 | 6/2006 |
| SE | SU 1174616 A * | 8/1985 |
| SE | SU 1258676 A1 * | 9/1986 |
| WO | 9707916 | 3/1997 |

* cited by examiner

FORCE-FITTING CLAMPING CONNECTION AND METHOD FOR ITS PRODUCTION

FIELD OF THE INVENTION

The invention relates to a force-fitting clamping connection comprising a first metal clamping surface, a second metal clamping surface, and a clamping element for clamping the clamping surfaces against one another. The invention also relates to a corresponding production method.

BACKGROUND

Such clamping connections, in which the clamping element is designed as a screw, are generally known from the prior art. In order to prevent shear stress on the screw, such a clamping connection is usually designed in such a way that the clamping surfaces of the components to be connected are fixed to one another by static friction.

When tightening a screw connection with a predefined tightening torque, a pre-stressing force is produced below the screw head and in turn produces a frictional force between the components to be connected. As long as the force to be transmitted between the components is lower than the frictional force, said components remain firmly connected to one another. If, on the other hand, the frictional force is exceeded, the components slip relative to one another.

A screw connection is usually designed by taking account of the following parameters:

$A_S$: stress cross section of the screw
$\sigma_S$: strength of the screw material used
$\eta$: utilisation of screw strength
$\mu$: friction coefficient value between the individual components.

Using these parameters, the maximum load to be transmitted between the individual components can be approximately calculated as follows:

$$F_{max} = \mu \cdot \eta \cdot A_S \cdot \sigma_S$$

When designing a metal screw connection, here the friction coefficient value is between 0.10 and 0.18 depending on the condition of the surface and the state of lubrication. This friction coefficient value can be increased by various additional measures. For example, it is possible to sand-blast the clamping surfaces of the components to be connected to one another, or to coat them with friction-increasing layers. In this case, friction coefficient values of up to 0.5 can be achieved.

However, these measures have the disadvantage that the friction coefficient value is reduced in the event of release and re-clamping of the clamping connection, in the event of dynamic stress or in the event of slipping of the clamping surfaces, since either the surface roughness decreases or the coating is removed. If the friction coefficient value originally provided cannot be maintained, it is necessary in some cases to post-machine the corresponding components prior to re-clamping, or even to replace the components, in order to ensure a desired level of static friction with sufficient certainty. This is particularly important in the case of clamping connections which are subject to high loads.

SUMMARY

Against this background, the object of the invention is to provide a clamping connection which allows a permanently high friction coefficient value between the clamping surfaces to be connected.

This object is achieved by a clamping connection. The clamping connection according to the invention comprises a first metal clamping surface, a second metal clamping surface, and a clamping element for clamping the clamping surfaces against one another. It is characterised in that the first clamping surface forms a hardened fine surface structure with microreliefs and microdepressions, and the second clamping surface has a lower hardness than the first clamping surface.

When the clamping surfaces are clamped against one another by means of the clamping element, the microreliefs of the first clamping surface sink into the second clamping surface, thereby producing a so-called microtoothing. The hardened fine surface structure formed on the first clamping surface is maintained even after multiple release and clamping of the clamping connection, so that, unlike in the prior art, there is no reduction in the friction coefficient value. In this way, a high friction coefficient value in the range from 0.20 to 0.5 can be permanently maintained on a releasable clamping connection.

For the second clamping surface, there are no special requirements with regard to the surface roughness. However, the second clamping surface preferably has a lower surface roughness than the first clamping surface, in order to keep any sticking effects as low as possible. The second clamping surface may be produced for example by a cutting machining operation and in principle may have the same surface roughness as the first clamping surface before a post-machining operation which increases the surface roughness.

It is possible to produce strongly pronounced microreliefs and microdepressions and thus a greater surface roughness on the first clamping surface by a cutting machining operation when producing the first clamping surface. However, these microreliefs and microdepressions are preferably obtained by a separate roughness-increasing surface treatment.

According to one preferred embodiment of the invention, the microreliefs and microdepressions are produced by sandblasting, shot-blasting or embossing, such as knurling for example.

The average roughness depth values $R_Z$ produced on the first clamping surface according to DIN 4768 are preferably in the range from 10 to 100 μm.

In principle, the entire first clamping surface may be formed with a uniform surface structure. However, it is also possible to form only sections of the first clamping surface with an increased surface roughness. According to one advantageous embodiment of the invention, sections comprising microreliefs and microdepressions with a greater surface roughness may alternate with sections with a lower surface roughness.

In this case, it is possible in particular to surface-treat only the sections with a greater roughness, while the remaining sections are not subjected to any additional surface treatment. Advantageously, however, the entire first clamping surface will be hardened.

The force-fitting clamping connection described above can be used wherever high transverse forces or torques have to be transmitted via a force-fitting connection.

According to one advantageous embodiment of the invention, this is used on a flange connection which comprises a first flange, a second flange and one or more clamping sleeves and also clamping elements assigned thereto for fixing the second flange to the first flange. In this case, the clamping sleeves can be clamped with end sides against the first flange in a force-fitting manner and are in engagement with the second flange via a bearing pressure. The transmission of a transverse force or a torque from the first flange to the second flange therefore does not take place directly but rather via the interposition of the clamping sleeves. Preferably, in this case, the first clamping surface is advantageously in each case formed on the end side of the clamping sleeves and the second clamping surface is formed on the first flange.

However, it is also conceivable to form the first flange with the harder, first clamping surface and the clamping sleeves with the softer, second clamping surface.

Since the clamping sleeves are clamped directly against the first flange, the second flange can be arranged between the first flange and the clamping sleeves with low axial forces or without any axial forces. The second flange is preferably adhesively bonded to the clamping sleeves.

In order to fix the clamping sleeves to the second flange, said clamping sleeves may in each case have a tapered extension which extends into a corresponding hole opening of the second flange. In this case, the axial length of the extension is preferably equal to or slightly greater than the hole depth of the hole opening. Any axial compensation with respect to the first flange takes place by means of adhesive material. This configuration avoids high pre-stressing forces on the second flange, so that the latter can be made of a non-metallic material, in particular a fiber composite material.

The abovementioned object is also achieved by a production method, which is characterised in that firstly the first clamping surface is formed, the first clamping surface is then subjected to a mechanical surface treatment which increases the surface roughness, in order to form microreliefs and microdepressions thereon, and thereafter the microreliefs and microdepressions that have been produced are fixed by hardening, whereby the first clamping surface is given a greater surface hardness than the second clamping surface.

Preferably, the first clamping surface is surface-treated by sand-blasting, shot-blasting or embossing before the hardening operation. In one advantageous embodiment of the method, the first clamping surface is produced by a forming or cutting machining process before the surface treatment.

BRIEF DESCRIPTION OF THE DRAWINGS

The invention will be explained in more detail below on the basis of examples of embodiments shown in the drawing. In the drawing.

DETAILED DESCRIPTION OF THE PREFERRED EMBODIMENTS

Figure 1:
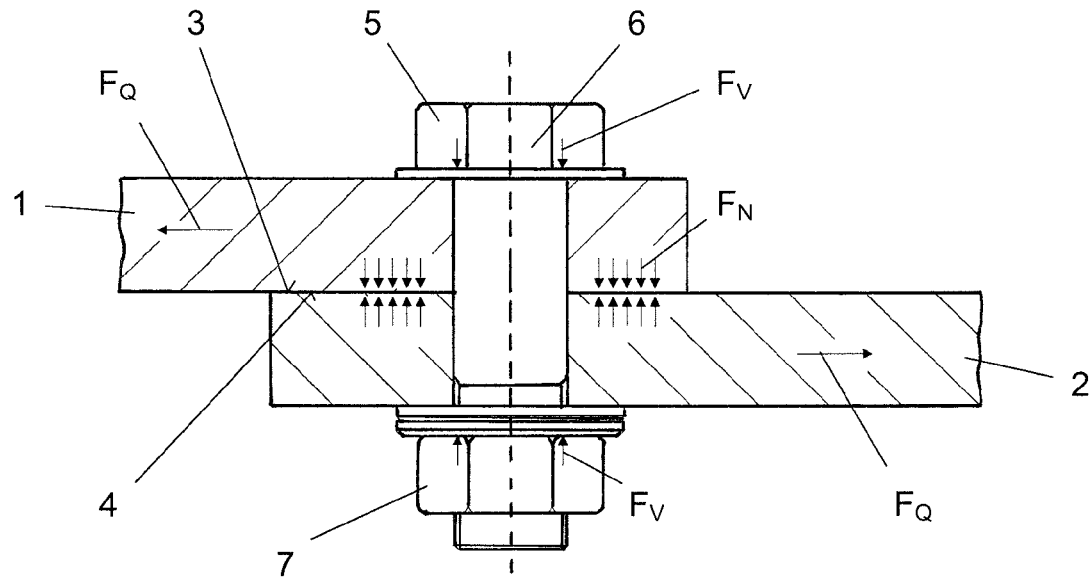
FIG. 1 shows a sectional view of a first example of embodiment of a force-fitting clamping connection according to the invention.

The first example of embodiment shows a force-fitting clamping connection for transmitting a transverse force $F_Q$ between two flanges 1 and 2. The two flanges 1 and 2 bear against one another by respective metal clamping surfaces 3 and 4 and are clamped against one another by a clamping element 5, which is designed here as a bolt 6 with a nut 7.

The pre-stressing force $F_V$ of the clamping element 5 is selected in such a way that, taking effect of sticking effects between the clamping surfaces 3 and 4, a normal force $F_N$ is produced which satisfies the following condition with respect to the transverse force $F_Q$ to be transmitted:

$$F_N \cdot \mu > F_Q$$

The higher the friction coefficient value $\mu$, the greater the transverse forces FQ that can be transmitted. According to the invention, therefore, one of the clamping surfaces 3 or 4 is provided with an increased surface roughness compared to conventional clamping surface pairs, so that a fine surface structure comprising microreliefs and microdepressions is obtained. This structure with an increased roughness is fixed by surface-hardening so that it is maintained even in the event of frequent release and clamping of the clamping connection and in the event of dynamic stress.

The opposite clamping surface 4 or 3 has a lower hardness by comparison, so that, in the clamped state, the microreliefs of the first clamping surface 3 form a microtoothing with the second clamping surface 4.

The first clamping surface 3 and also the second clamping surface 4 are firstly produced in the conventional manner, for example by a cutting machining or forming process. While the first clamping surface 3 is then subjected to a surface treatment which increases the surface roughness and to a subsequent hardening operation, no further measures are necessary on the second clamping surface 4.

If a friction coefficient value in the range from 0.10 to 0.18 is obtained in the case of clamping surfaces produced in the conventional manner, a permanently increased friction coefficient value in the range from 0.20 to 0.5 is obtained as a result of the additional surface treatment of the first clamping surface 3.

In principle, suitable methods for the surface treatment of the first clamping surface 3 are all methods which can be used to mechanically produce a defined surface roughness. Suitable methods are in particular those methods in which microreliefs and microdepressions can be produced mainly by forming, such as e.g. sand-blasting, shot-blasting and embossing methods, including knurling.

Preferably, the average roughness depth $R_Z$ on the first clamping surface 3 lies in the range from 10 to 100 μm, more preferably in the range from 20 to 63 μm.

In the example of embodiment discussed here, the second clamping surface 4 has a smaller roughness depth $R_Z$ than the first clamping surface 3. Suitable values lie in the range from 2.5 to 100 μm, preferably in the range from 2.5 to 40 μm. Any smoothing effects on the second clamping surface 4 caused by repeated clamping and release do not cause any problems, since the microtoothing is formed anew upon each clamping operation due to the lower hardness of the second clamping surface 4.

In a modification of the illustrated example of embodiment, it is possible to form a defined increased surface roughness on the first clamping surface 3 at the time of producing the latter, for example by cutting machining, and then to fix it by hardening.

It is also possible to provide only sub-sections of the first clamping surface 3 with a greater surface roughness and to treat them accordingly for this purpose.

Figure 2:
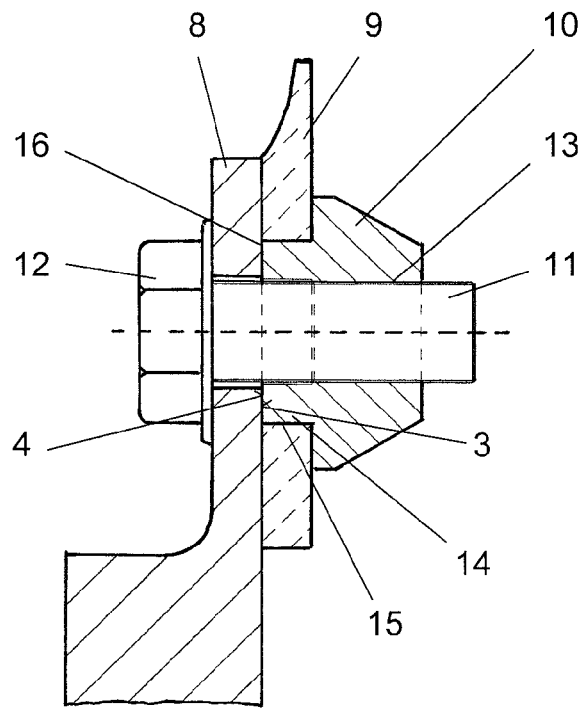
FIG. 2 shows a sectional view of a second example of embodiment of a force-fitting clamping connection according to the invention.

FIG. 2 shows a flange connection in which a force-fitting clamping connection of the type described above is used for transmitting high torques. The flange connection comprises a first flange 8 made of a metal material, preferably steel, and a second flange 9 which is made here by way of example of a fiber composite material.

The flange connection also comprises a plurality of clamping sleeves 10 made from hardenable steel, and also clamping elements 11 assigned thereto in the form of threaded bolts. The clamping elements 11 are passed through the first and second flange 8 and 9 and are supported in each case with a head 12 against the first flange 8. Each clamping element 11 is also screwed to a clamping sleeve 10, which for this purpose has an inner thread 13.

The clamping sleeves 10 in each case have a tapered extension 14 which extends through a corresponding hole opening 15 of the second flange 9, in order to allow torque transmission by way of a bearing pressure. Each of the clamping sleeves 10 is clamped against the first flange 8 at the end side 16 of the extension 14 in the installed state.

For the force-fitting transmission of high torques between the first flange 8 and the clamping sleeves 10, the first clamping surface 3 mentioned in connection with the first example of embodiment is provided on the clamping sleeves 10 while the second clamping surface 4 is located on the first flange 8.

Figure 3:
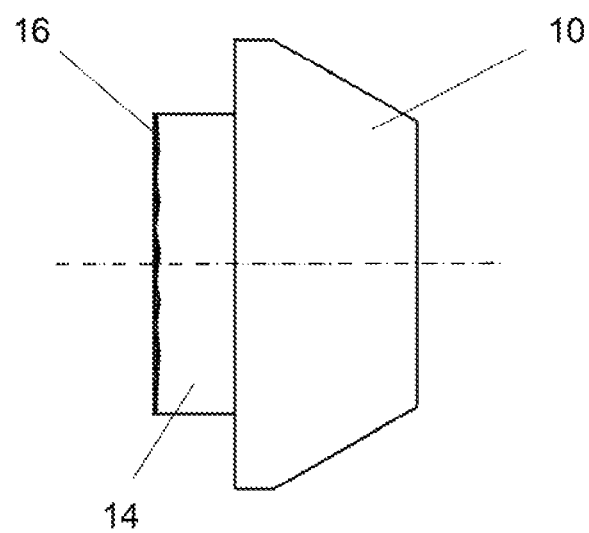
FIG. 3 shows a side view of the clamping sleeve from FIG. 2.
Figure 4:
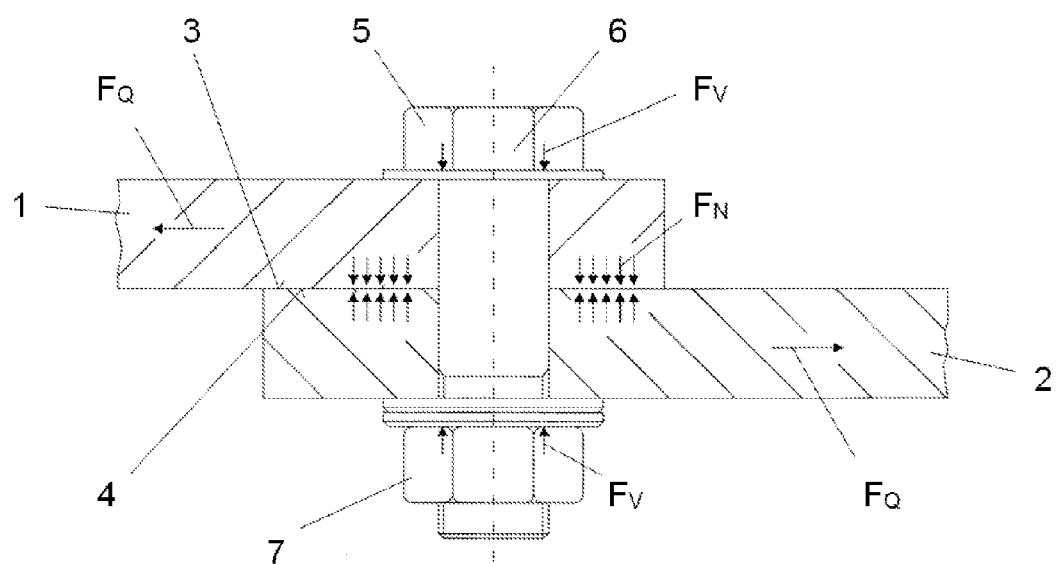
FIG. 4 shows a sectional view of an embodiment of a force-fitting clamping connection according to the invention.

As can be seen in particular in FIG. 3, the hardened fine surface structure with increased surface roughness is located on the end side 16 of the respective clamping sleeve 10, so that the microreliefs and microdepressions thereof enter into engagement with the first flange 8. As also shown in FIG. 3, a corresponding surface treatment of the clamping sleeves 10 can be restricted to the end sides 16, which results in a particularly economic use of the method according to the invention. In particular, the hardening also preferably takes place only in the region of the surface-treated end side 16.

The clamping sleeves 10 may additionally be adhesively bonded to the second flange 9. The axial length of the extension 14 corresponds at least to the thickness of the second flange 9. Any axial play of the second flange 9 relative to the first flange 8 is compensated by curing adhesive material.

By using the method described above, it is possible to permanently increase the friction coefficient value of such a flange connection, which in the case of conventionally produced clamping surfaces would be approx. 0.15, to more than 0.20 as a result of roughening by means of shot-blasting or sand-blasting followed by subsequent surface hardening, and thus to increase the maximum torque that can be transmitted. In particular, values in the range from 0.28 to 0.35 can be achieved here.

The invention has been described in detail above on the basis of examples of embodiments. However, it is not limited to these examples of embodiments but rather encompasses all embodiments defined by the claims.

We claim:

1. A force-fitting clamping connection comprising:
   a first metal clamping surface;
   a second metal clamping surface; and
   a clamping element for clamping the clamping surfaces against one another;
   wherein the first clamping surface forms a metal surface structure with microreliefs and microdepressions, said metal surface structure being surface-treated and hardened;
   wherein the second clamping surface has a lower hardness than the first clamping surface;
   wherein the second metal clamping surface has a lower surface roughness than the first metal clamping surface;
   wherein the first metal clamping surface has an average roughness depth $R_Z$ in the range from 10 to 100 μm; and
   wherein the second metal clamping surface has an average roughness depth $R_Z$ in the range from 2.5 to 40 μm.

2. A force-fitting clamping connection according to claim 1, wherein the microreliefs and microdepressions are obtained by a surface treatment which increases the roughness.

3. A force-fitting clamping connection according to claim 2, wherein the metal surface structure of the first metal clamping surface having said microreliefs and microdepressions is a sand-blasted, shot-blasted, or embossed surface structure.

4. A force-fitting clamping connection according to claim 1, wherein a friction surface pair consisting of the first and second clamping surface has a friction value in the range from 0.20 to 0.5.

5. A force-fitting clamping connection according to claim 1, wherein the first clamping surface has sections comprising microreliefs and microdepressions with a first surface roughness and also further sections with a lower surface roughness and wherein the first surface roughness is greater than the second surface roughness.

6. A force-fitting clamping connection according to claim 1, wherein the first clamping surface has surface-treated sections and non-surface-treated sections, wherein the surface-treated sections have a greater surface roughness than the non-surface-treated sections.

7. A force-fitting clamping connection according to claim 1, wherein the first clamping surface is completely surface-treated.

8. A force-fitting clamping connection according to claim 1, wherein the clamping connection is releasable.

9. A flange connection comprising:
   a first flange;
   a second flange;
   one or more clamping sleeves and also clamping elements assigned to the one or more clamping sleeves respectively for fixing the second flange to the first flange;
   wherein each clamping sleeves is clamped with end sides against the first flange in a force-fitting manner and are in engagement with the second flange via a bearing pressure, and;
   wherein a first clamping surface is formed on the end side of each of said one or more clamping sleeves, a second metal clamping surface is formed on the first flange and each first metal clamping surface at each of said clamping sleeves engages with the second metal clamping surface at the first flange, respectively;
   wherein said one or more clamping elements clamp said first metal clamping surfaces at each of said one or more clamping sleeve against said second metal clamping surfaces at the first flange, respectively;
   wherein the first metal clamping surface forms a metal surface structure with microreliefs and microdepressions, said metal surface structure being surface-treated and hardened;
   wherein the second metal clamping surface has a lower hardness than the first metal clamping surface;
   wherein the first metal clamping surface has an average roughness depth RZ in the range from 10 to 100 μm; and
   wherein the second metal clamping surface has an average roughness depth RZ in the range from 2.5 to 40 μm.

10. A flange connection according to claim 9, wherein the second flange is adhesively bonded to the clamping sleeves.

11. A flange connection according to claim 9, wherein said one or more clamping sleeves in each case have a tapered extension which extends into a corresponding hole opening of the second flange, wherein the axial length of the extension is equal to or slightly greater than the hole depth of the hole opening, and any axial compensation with respect to the first flange takes place by means of adhesive material.

* * * * *